United States Patent [19]

de Maight et al.

[11] 4,329,912

[45] May 18, 1982

[54] AUXILIARY POWER STEERING FOR MOTOR VEHICLES

[75] Inventors: Winfried de Maight, Mutlangen; Ronald Schütze, Mögglingen, both of Fed. Rep. of Germany

[73] Assignee: Zahnradfabrik Friedrichshafen, AG., Friedrichshafen, Fed. Rep. of Germany

[21] Appl. No.: 52,189

[22] Filed: Jun. 26, 1979

[30] Foreign Application Priority Data

Jul. 1, 1978 [DE] Fed. Rep. of Germany ....... 2829064

[51] Int. Cl.³ .......................................... F15B 13/042
[52] U.S. Cl. ...................................... 91/420; 91/452; 137/106; 180/132
[58] Field of Search ..................... 137/87, 106; 91/420, 91/452; 138/46, 45; 251/12, 324, 284; 60/460; 180/132

[56] References Cited

U.S. PATENT DOCUMENTS

| | | | |
|---|---|---|---|
| 2,347,238 | 4/1944 | Bennett | 251/284 X |
| 2,845,901 | 8/1958 | MacDuff | 91/420 |
| 3,058,719 | 10/1962 | Beebee | 251/284 X |
| 3,749,112 | 7/1973 | Nishikawa et al. | 91/420 X |
| 3,964,371 | 6/1976 | Wagner et al. | 91/434 |
| 4,040,438 | 8/1977 | Wilke | 137/106 |

*Primary Examiner*—Irwin C. Cohen
*Attorney, Agent, or Firm*—Zalkind & Shuster

[57] ABSTRACT

A throttle valve biased to open position by a spring is interposed in the return line of a steering control valve in a booster steering system. The essential feature of the invention is that one face of the valve is exposed to feed pressure acting against a valve opening bias spring to produce the throttling effect in accordance with construction and design of the valve and the system in which it may be used. The invention is particularly intended for use with booster steering control valves in neutral or steering position and ensures throttling of return flow to the system sump only during a steering operation. The invention is usable in steering mechanisms such as shown in the patent to Wagner et al., U.S. Pat. No. 3,964,371.

12 Claims, 5 Drawing Figures

AUXILIARY POWER STEERING FOR MOTOR VEHICLES

The prior art has throttle valves in return lines from booster steering control valves intermediate the control valve and the sump for restricting return flow in a controlled manner thereby improving the steering control and function of the control valve. In the instance of a shifted position, a return line throttling valve with a build up of pressure in the return line inherently leads to a considerable damping or elimination of flow noise, such as hissing, etc., which may occur. The damping effect is conditional on mode of design, use and system. However, such throttling valve when used in conjunction with a steering control valve in neutral position produces impairment in steering control upon return to straight ahead steering.

A further disadvantage has been found in the neutral position of a steering control valve, with a throttling valve, in that there is a pressure build up in the return line causing unnecessary heating of the hydraulic fluid and waste of power.

The present invention has for its object the provision of a throttle valve for use with a power steering control valve which functions in neutral position in essentially the same manner it would function when shifted, in that return steering movement will not be impaired nor power wasted.

Briefly, the invention utilizes in a broad sense a valve piston in a throttle valve which is spring biased to open flow in the return line, but wherein a valve housing means is provided with a bore whereby feed pressure from the engine driven booster steering pump acts during a steering operation on the valve against predetermined spring pressure. The feed line pressure acting on the valve piston can actuate it so as to close down a throttling edge or coacting edges of the throttle valve which restricts return flow in the return line. This, however, occurs only when there is an operational pressure in the engine pump feed line acting on the throttle valve piston. Accordingly, such return flow restriction occurs only during a steering operation when booster steering feed pressure is required, and its has been found that undesirable phenomena and drawbacks as described above are thus avoided.

Further, the throttle valve of the invention is independent of the type of steering control valve arrangement and may be used for rotary spool valves, rotary pistons, or axially movable reciprocal valves. Still further, the throttle valve of the invention may be integrated physically into the steering control valve housing or it may be carried outside such housing and connected to flow lines going to the housing whereby the invention can be added to existing booster steering systems.

Various expedients and modifications for simplicity are provided in that a simple prestressed spring in the throttle valve can be used in a piston chamber of the housing means which chamber carries the throttling piston, the chamber being connected in the return line of the steering control valve. Accordingly, the effect permits return line back pressure to act against the entire piston surface and after completion of a steering movement of the vehicle, the return force to open position is increased as a result.

A further simple expedient inherent in the invention is that the piston chamber may be readily connected with the return line by way of a duct or channel means bypassing the piston for return flow into the chamber. Also, an increase of return force is achieved in a modification wherein the valve piston is fashioned as a differential pressure piston wherein the greater effect of piston surface is exposed to return line pressure.

The valve piston may be provided with an adjustable motion limiting pin so that feed line booster pressure on the valve piston can cause throttling only up to a predetermined point of throttling area cross section. This insures that the throttling flow area is not decreased beyond a point predetermined for the particular system in which the invention is to be used.

The piston itself may effect a valve to block flow through the chamber by having a ball valve head coacting with a valve seat in the chamber. Return flow is initially unthrottled past the valve seat. However, a bypassed throttled flow occurs when upon actuation of the piston during a steering operation unthrottled flow through the chamber is blocked by booster pressure actuating the piston. Thereafter, a throttled flow passes through a fixed orifice in a bypass line.

Further, the throttling area or valve may be shunted by an additional return passage having a relief valve therein. Such a construction limits return flow pressure independently of the throttle flow. The reason for this is that strong oscillations in the flow can cause pressure oscillation in the throttle valve, and where high pressures are being met, this could cause damage in the low pressure portions of the system, e.g, in the steering control valve. Accordingly, such safety relief valve is a safeguard against damage occurrence.

The throttling area of various modifications can be simply a beveled end of the piston, or a flow area around the piston provided by a necked down central area with curved ends. In either case such throttling portion of the piston coacts with the juncture of a return passage and the chamber which effects a port normally open for unthrottled return flow but restricted by piston movement for throttled return flow.

A detailed description of the invention now follows in conjunction with the appended drawing in which all figures will be understood to be longitudinal cross section of a housing means for varius modifications of the invention, as follows.

Figure 1:
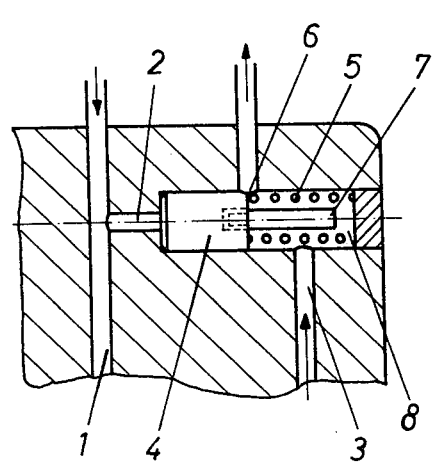
FIG. 1 illustrates the modification wherein a simple piston is utilized for controlling throttling flow in a return line.

As noted hereinabove, any of the constructions shown can be integrated into a steering control valve housing or mounted exteriorly in the return line. Preferably the throttle valve is connected between a steering control valve and the system sump or tank. In the description to follow, it may be assumed that the housing means for the piston chamber in any of the constructions can be affixed to the housing of a steering control valve by attachment as with a flange, not shown.

In all figures of the drawing, like parts are designated in most instances with the same reference numerals. Thus, in FIGS. 1–3, the pressure feed from an engine driven pump flows through a passage 1 of the throttle valve housing, intersecting a cross passage 2 to the housing interior, and the return line flow is through a passage 3. In FIG. 4, such return line is shown as upstream and downstream sections designated as 3a—3b, respectively. Similarly, in FIGS. 1–3, a valve opening bias spring 5 maintains open throttle, such spring being designated with reference numeral 17 in FIG. 4.

Referring specifically to FIG. 1, a throttle valve piston 4 in piston chamber 8 has one face exposed via cross passage 2 to booster pressure feed in passage 1 acting against prestressed compression in throttle opening bias spring 5 secured within the chamber of the housing, as shown. The other or opposite face of the piston is interiorly exposed in chamber 8 to return line pressure in passage 3 acting in the opening bias direction of spring 5.

Such other face of the piston is provided with a throttling edge 6 which will be understood to coact with the upper or downstream section of opening passage 3, as shown, so that fluid will be effectively throttled through the return passage as valve piston 4 moves toward the right, as seen in FIG. 1. Such return line pressure fills the chamber 8 of the housing so as to be accessible to the other face of the piston, and the piston carries a motion limiting pin 7 which can abut against a removable housing closure plug, as shown, to predetermine the degree of throttle flow restriction permitted. It should be noted that the spacing between the end of pin 7 and the plug is for illustration only and can be adjustably predetermined for any desired degree of throttling by the simple expedient of having the pin threaded into the piston. Thus, the wide gap shown in FIG. 1 between pin and plug may be assumed as illustrative of very restricted throttling in the extreme actuated position of piston 4. The same would hold true for the modifications of FIGS. 2 and 3 which likwise have a motion limiting pin 7.

The spring 5, of course, not only serves to counteract feed line pressure in passage 1 for throttling control but also moves the piston back to full open throttle at the end of a steering function of a vehicle, in conjunction with back pressure effected by return flow throttling, against the piston.

In the operation of the embodiment shown in FIG. 1, high booster pressure oil flow is conducted through passage 1, thence via cross passage 2 against a face of piston 4, the other face of which is exposed in a return line pressure passage 8, all within the housing shown fragmentarily in cross section. High pressure fluid may come from an engine driven pump (not shown) through passage 1 to a steering control valve (not shown) and by way of return from the steering control valve via passage 3 in the direction of the arrows so as to fill chamber 8 and pass outwardly thereof to a sump (not shown). A throttling edge 6 on piston 4 is provided which can restrict or throttle flow from chamber 8 so as to control steering valve and steering functions. Compression spring 6, predeterminedly pretensed, holds piston 4 to full open throttle position, as shown, when there is no operating pressure in passage 1, and the pretension in such spring is, of course, determined by the pressure values and other factors of the steering sytem in which the invention is used. Thus, booster pressure on one face of the piston actuates it to effect throttling only a steering operation and upon cessation of such pressure the pressure built up in chamber 8 aids in return of the piston to an unthrottled condition.

Figure 2:
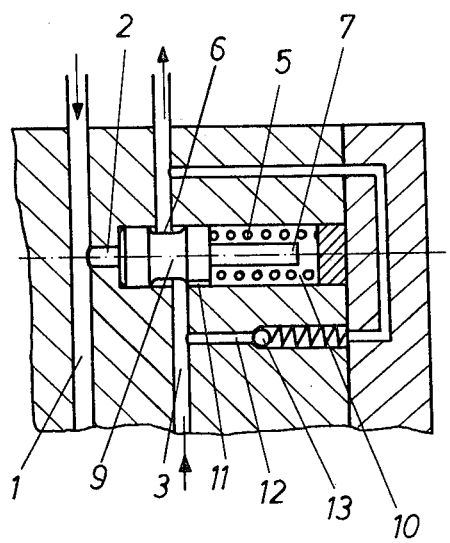
FIG. 2 illustrates a modification wherein a throttling piston has a necked down central portion as a flow area and includes a relief valve shunted around the throttling piston.

Referring now to FIG. 2, a piston 9 is necked down between two sections for unthrottled flow and provides a curved throttling edge. Chamber 10 supports a piston section having a grooved channel 11 for return flow from passage 3 to the chamber. Such channel could be in the wall of chamber 10.

A shunt or bypass passage 12 is provided from the upstream to the downstream sections (indicaed by arrows) of return passage 3 and a spring biased check valve 13 with coacting seat incorporated therein. The purpose of passage 12 and the check valve is to serve as a pressure relief in the event of too high a rise in pressure in the return line. Such pressure relief flow bypassing the throttled flow area may be used with all embodiments of the invention to preclude pressure oscillations in the throttle valve and damaging effects in the low pressure parts of the system.

Figure 3:
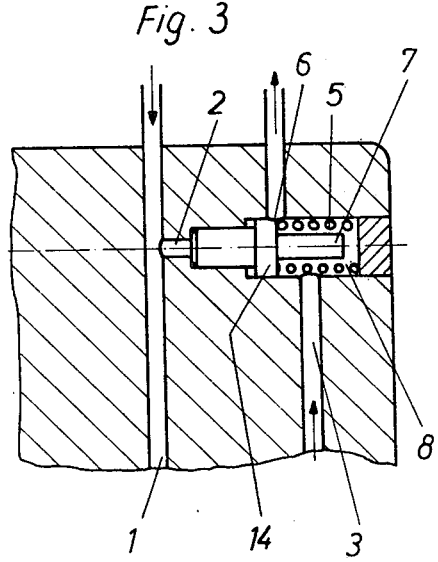
FIG. 3 is somewhat similar to the construction of FIG. 1, except for use of a differential pressure piston.
Figure 4:
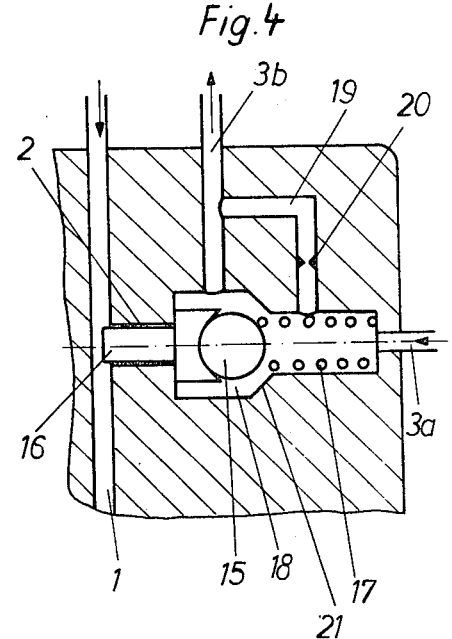
FIG. 4 is a modification using a ball valve shutoff in conjunction with a fixed throttling orifice.
Figure 5:
FIG. 5 is a block diagram showing a steering system in which the throttle valve of the invention is used.

Referring to FIG. 3, the distinction therein is a provision of an enlarged section 14 of the piston thereby effecting a differential piston such that the area acted on by return line pressure is greater than that acted on by feed line pressure. This would, of course, increase the opening force effective on the throttling edge 6 in conjunction with the compression in spring 5. Further, if desired, the increased return line pressure force on the piston can be predetermined to an extent that spring 5 my possibly be omitted. The particular advantage of the embodiment of FIG. 3 is that a differential pressure piston can increase the linear range of pressure rise up until the point where motion is stopped by pin 7. Accordingly, the throttle valve would have more universal application.

Comparison of FIGS. 1–3 indicates that in the event of neutral or shifted position of the steering control valve the throttle valve piston 4, 9 or 14 will always be in the open position, as shown. However, where the throttle valve is used with a shifted steering control valve there will be a pressure buildup in feed line passage 1 so as to shift the respective piston against the force of respective spring 5. Accordingly, throttling takes place at edge 6 in each case with the buildup of pressure in return passage 3. Subsequent to completion of a steering operation of the vehicle and drop in feed line pressure, the throttle valve piston returns to full open position and there is no further throttling of return line flow. In FIGS. 1 and 2, return force on the throttle valve piston is effected by the respective spring 5 and return line pressure, and in FIG. 3 an increased force is effected by the use of the differential pressure piston 14.

Thus, the embodiments shown in FIGS. 1–3 are essentially similar, but a substantially different construction is shown for the modification of FIG. 4.

In FIG. 4, a ball valve head 15 and pilot piston 16 replace the pistons of the preceding modifications and such ball is actuated by feed line pressure acting on a differential pressure pilot piston 16, slidable in cross passage 2. Ball 15 can close against seat 21. A pretensed spring 17 maintains the ball movably in full open position within the chamber 18, such open position being fixed by the enlargement of the pilot piston abutting the end of the chamber, as shown.

Return pressure flow is via upstream and downstream passage sections 3a and 3b, respectively, with direction of flow as shown by the arrows. A bypass passage 19 within the housing shunts chamber 18 to the downstream exit section 3b with a fixed orifice throttle 20 in the passage 19.

When the ball is in the open position shown and not seated against ball valve seat 21 return flow simply passes through chamber 18 from return passage section 3a to section 3b.

When used with a shifted steering control valve with booster feed pressure in passage 1, the pilot passage 16 acts as a differential pressure piston and actuates ball 15 into closure against valve seat 21. Accordingly, no flow can pass the valve seat to flow unthrottled from section 3a to section 3b. In that event, flow takes place past the fixed throttling orifice 20 in passage 19 to effect a pressure buildup in the return passage. Upon completion of vehicle steering and dropping of feed pressure in passage 1, the pressure in chamber 18 which has been built up on the upstream side of throttle orifice 20 in conjunction with spring 17, acts to separate ball 15 from seat 21 to permit unrestricted return flow through chamber 18. Pressure opening force on ball 15 is, of course, augmented by the differential piston dimensioning.

What is claimed is:

1. In a booster steering system having a pump for booster pressure, a booster steering motor, a control valve and a tank, the improvement comprising:
    a non-closing throttle valve for throttling return flow comprising a housing means having a piston chamber (8) and a piston (4) movable therein and having one face exposed therein:
    booster pressure flow means (1) communicating booster pressure to the other face of said piston and return flow means (3) connected for return flow to and from said chamber;
    a throttle means (6) operative on movement of said piston to effect throttling of return flow through said chamber when said piston is shifted by booster pressure on said other face;
    means (5) for biasing said piston to an open throttle condition;
    wherein said return flow means comprises an upstream passage leading to said piston chamber for return flow thereto and a downstream passage leading from said piston chamber for return flow therefrom;
    said throttle means comprising coacting portions of said downstream passage and said piston wherein said passages are axially spaced in said chamber and said downstream passage having a port directly open on the circumferential wall of said chamber directed thereinto normally adjacent a coacting throttling edge of said piston whereby flow is throttled by movement of said piston across the face of said port, and means (7) for limiting movement of said piston, when acted upon by booster pressure, to a predetermined maximum extent to ensure throttling flow.

2. A system as set forth in claim 1, said piston having a portion intermediate said upstream passage and said chamber;
    and a channel means (11) bypassing said piston portion and connecting said upstream passage to said chamber for return flow thereto.

3. A system as set forth in claim 1, wherein said other piston face is of smaller cross section exposed to booster pressure and said one piston face is of larger cross section exposed to return flow pressure in said chamber so as to effect a differential pressure piston effecting movement thereof in a direction for open throttle condition.

4. A system as set forth in claim 1, said last named means effecting an adjustable limit stop (7) for movement of said piston under booster pressure.

5. A system as set forth in claim 1, including a pressure relief bypass passage (12) connected to bypass flow around said chamber having an excess pressure relief valve therein.

6. A system as set forth in claim 1, said means limiting movement of said piston comprising a pin extending therefrom and adjustably positionable therein;
    said housing means having a removable plug for access to said pin for adjustment; said pin being abuttable with said plug for limiting motion of said piston under booster pressure.

7. A system as set forth in claim 1,
    said piston comprising a pair of spaced sections with a necked down portion therebetween and across said passages to permit unthrottled return flow to pass said piston;
    said necked down portion having a juncture with one section of said piston providing a throttling edge;
    the other section of said piston being guidingly supported in said chamber;
    and means (11) for bypassing return flow past said other section to said chamber.

8. A system as set forth in claim 1, said booster pressure flow means comprising a passage (1) through said housing means and a cross passage (2) therefrom leading to said other face of said piston;
    said one face of said piston having said edge coacting with the port of said downstream passage to effect throttling upon movement of said piston relative to said port.

9. A system as set forth in claim 1, wherein said biasing means comprises a pretensed spring, and wherein said other piston face is of smaller cross section exposed to booster pressure and said one piston face is of larger cross section exposed to return flow pressure in said chamber so as to effect a differential pressure piston effecting movement thereof in a direction for open throttle condition.

10. A system as set forth in claim 1, including means effecting an adjustable limit stop of said means for limiting movement of said piston under booster pressure, and including a pressure relief bypass passage connected to bypass flow around said chamber having an excess pressure relief valve therein.

11. A system as set forth in claim 1, said means for limiting movement of said piston comprising a pin extending therefrom and adjustably positionable therein;
    said housing means having a removable plug for access to said pin for adjustment;
    said pin being threadedly secured for adjustment in said piston and abuttable with said plug for limiting motion of said piston.

12. A system as set forth in claim 1, said piston chamber being a bore in said housing means; and
    said passages being in said housing means.

* * * * *